United States Patent [19]

Erwin

[11] 4,378,790

[45] Apr. 5, 1983

[54] DEMOUNTABLE SOLAR OVEN

[76] Inventor: Samuel F. Erwin, P.O. Box 2209, Sedona, Ariz. 86336

[21] Appl. No.: 262,565

[22] Filed: May 11, 1981

[51] Int. Cl.³ .............................................. F24J 3/02
[52] U.S. Cl. ................................. 126/451; 126/438; 126/424
[58] Field of Search .............. 126/438, 439, 424, 425, 126/451, 417

[56] References Cited

U.S. PATENT DOCUMENTS

| | | | |
|---|---|---|---|
| 1,220,091 | 3/1917 | Goff | 126/424 |
| 1,424,932 | 8/1922 | Moreau | 126/451 |
| 2,859,745 | 11/1958 | von Brudersdorff | 126/270 |
| 2,909,171 | 10/1959 | Lof | 126/270 |
| 3,025,851 | 3/1962 | Steinberg | 126/270 |
| 3,053,248 | 9/1962 | Daymon | 126/270 |
| 3,171,403 | 3/1965 | Drescher | 126/270 |
| 3,174,476 | 3/1965 | Steinberg | 126/270 |
| 3,391,688 | 7/1968 | Dery | 126/270 |
| 3,938,497 | 2/1976 | Andrassy | 126/270 |
| 4,010,080 | 3/1977 | Tsay et al. | 202/83 |
| 4,077,391 | 3/1978 | Way, Jr. | 126/270 |
| 4,125,109 | 11/1978 | Erwin | 126/270 |
| 4,203,427 | 5/1980 | Way, Jr. | 126/451 |

Primary Examiner—James C. Yeung
Attorney, Agent, or Firm—Charles E. Cates; Victor Myer

[57] ABSTRACT

A demountable solar oven includes a principal base upon which is mounted a secondary supporting base collar which contains the essential operating parts and which supports two removable arms at their base whose upper end form diametrically opposed pivots for receiving the appropriately disposed pivots of the cooking chamber. The food basket provided with similarly diametrically opposed pivots is disposed interiorly of the cooking chamber and by virtue of a weight disposed at the bottom thereof the wire basket always maintains a horizontal position irrespective of the angle of the oven itself. A transparent hemispherical cover including a shadow box indicator is disposed over the oven in the direction of the sun and a series of individual plate reflectors are hinged together by means of pins, a certain number of which pins are utilized to attach the reflectors to the oven rim. Adjustable feet are disposed at the bottom of the supporting base for adjusting the vertical position of the oven and a level indicator as well as rotationally directional indicators are provided for determining the position of the oven as desired. The disassembled parts occupy a minimum space and various of the parts can be disposed together for the disassembled unit to occupy a very small space.

14 Claims, 12 Drawing Figures

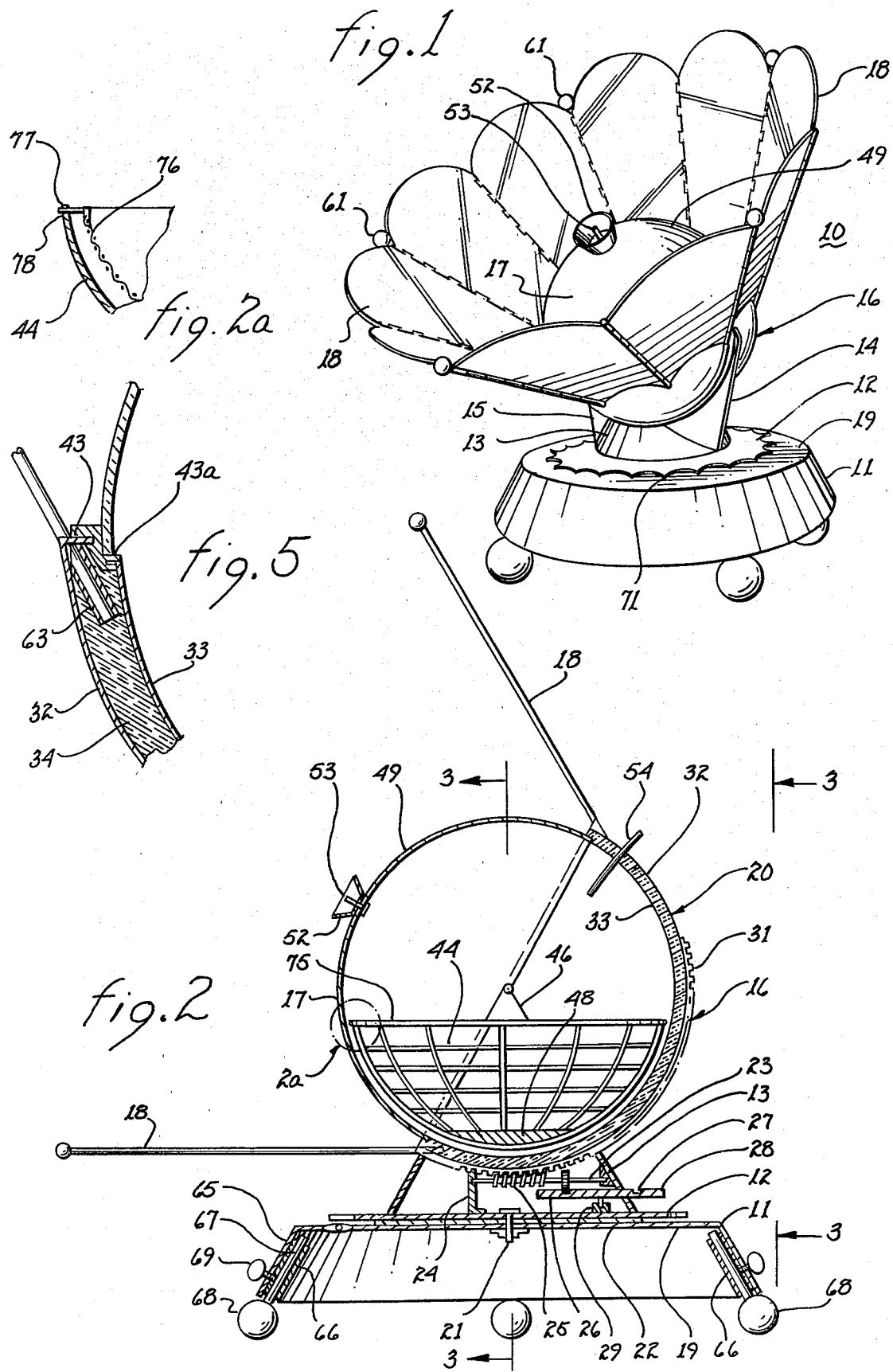

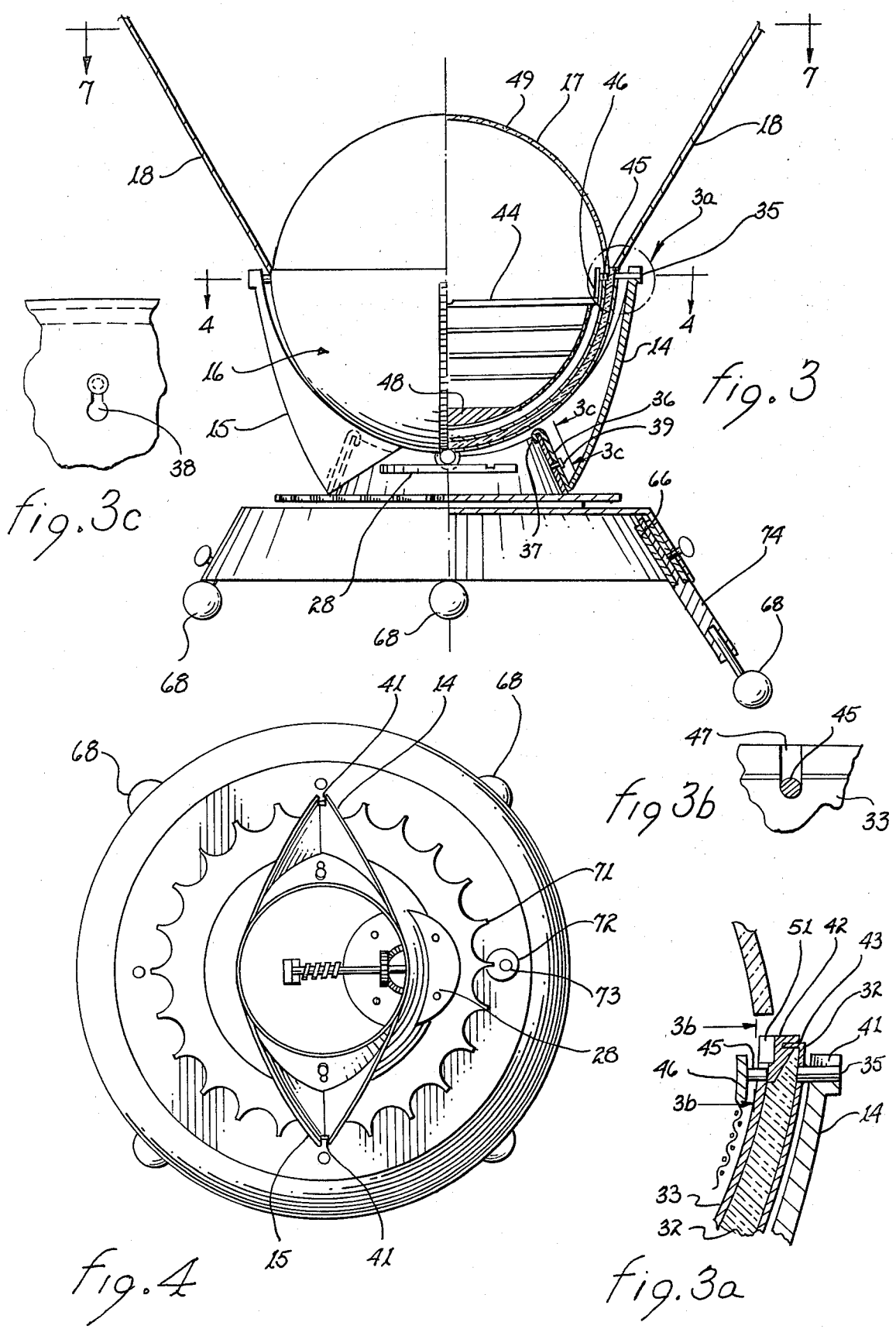

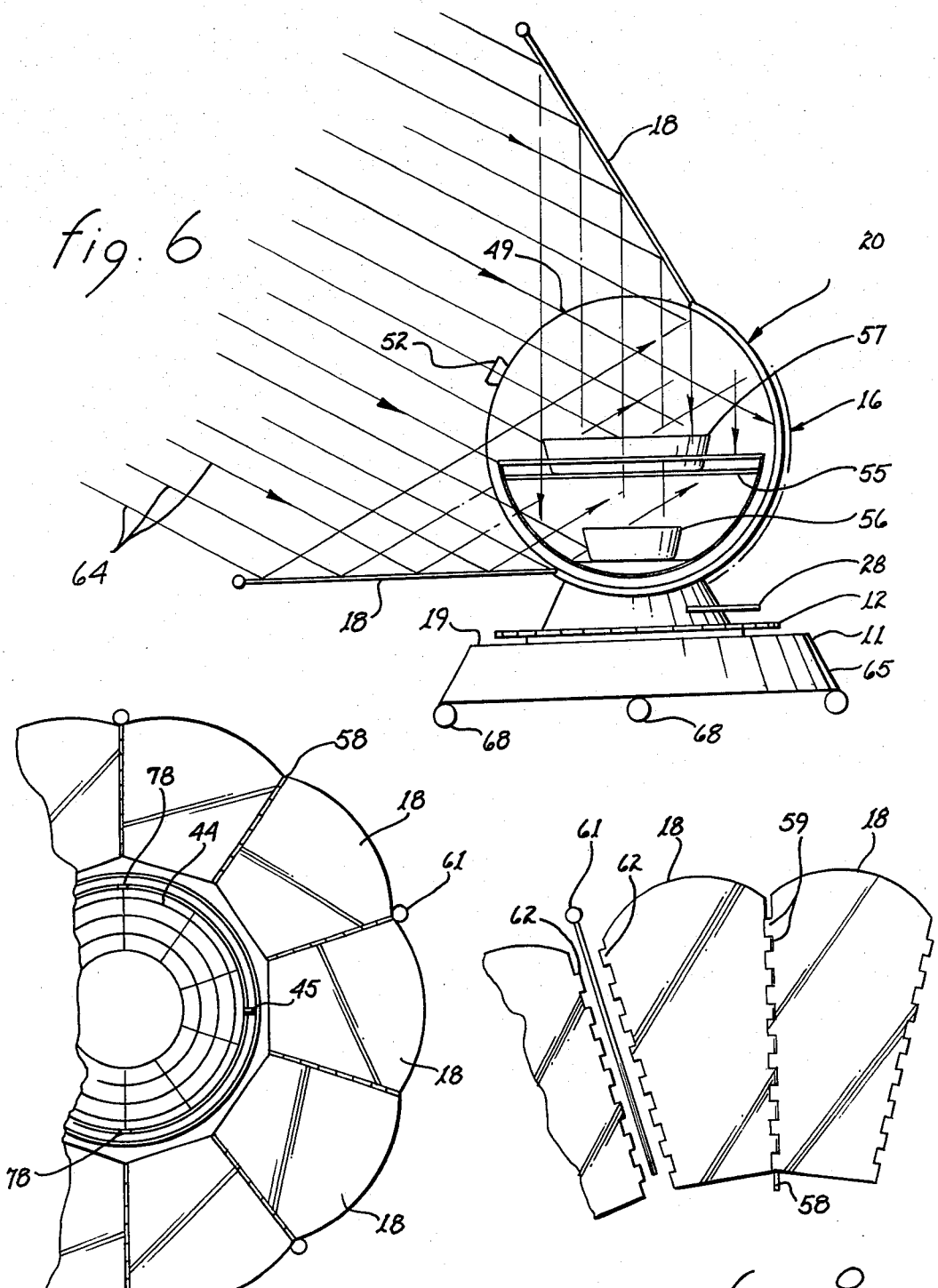

DEMOUNTABLE SOLAR OVEN

BACKGROUND OF THE INVENTION

The advent of the energy crisis has led people to consider the use of solar energy for cooking purposes and the art is replete with solar ovens, one example of which is the applicant's U.S. Pat. No. 4,125,109 issued on Nov. 14, 1978.

In the main, the prior art solar ovens have been bulky and not easily disassembled for carrying purposes even though they were intended to be portable. Moreover, the application of solar generated heat to the food being cooked was relatively inefficient thereby contributing to the bulk of the oven itself.

It is evident that solar ovens, at least in principle, would lend themselves readily to use on picnics, outings and the like because no fire or other energy source is needed for preparing the food desired. When a solar oven for this purpose is relatively compact while disassembled, assembles easily into an effective unit and efficiently utilizes the solar generated heat for preparing the food it becomes clear that the demountable and portable solar oven is a natural.

SUMMARY OF THE INVENTION

The invention relates to a portable and demountable solar oven that overcomes the deficiencies of the prior art articles for this same purpose and it is an object of the invention to provide an improved solar oven of this nature.

It is a further object of the invention to provide an improved solar oven that is simple, effective, portable, easy to assemble and disassemble and efficient in operation.

In carrying out the invention according to one form there is provided a demountable solar oven comprising: a supporting base, a horizontally rotatable member mounted on the base, a hollow columnar member having a circular opening disposed on the rotatable member, a pair of arms removably attached at one end to the columnar member and having their other ends projecting upwardly, a double walled hemispherical oven chamber including a diametrically opposed first pair of pivot members on its open rim removably disposed, respectively, on the other ends of the first pair of arms, the double walled chamber comprising a reflective inner wall, a supportive outer wall and a layer of insulation therebetween, a hemispherical transparent cover receivable at its circular edge on the edge of the inner wall, a series of elongated reflecting segments adjacent each other and removably attached to the rim of the oven chamber, a gear mechanism supported by the columnar member, a gear member disposed exteriorly on the surface of the supportive outer wall and engaged with the gear mechanism, and means for rotating the gear mechanism and pivoting the oven chamber about the diametrically opposed first pair of pivots for changing said oven's solar angle.

It is a further object of the invention to provide an improved solar oven that is easy to adjust for receiving the maximum of solar energy and to maintain the food being cooked in the optimum position at all times.

Further objects and advantages of the invention will become apparent as the description proceeds.

BRIEF DESCRIPTION OF THE DRAWINGS

For a more complete understanding of the invention reference should now be had to the accompanying drawings in which FIG. 1 is a perspective view of a solar oven embodying the invention;

FIG. 2 is a sectional view of the solar oven shown in FIG. 1;

FIG. 2a is an enlarged scale detailed view taken at the location shown on FIG. 2;

FIG. 3 is a compound view including a sectional view all taken substantially in the direction of the arrows 3—3 of FIG. 2;

FIGS. 3a, 3b and 3c are enlarged scale detailed views taken at the locations shown on FIGS. 3 and 3a;

FIG. 4 is a fragmentary view taken substantially in the direction of arrows 4—4 of FIG. 3;

FIG. 5 is a fragmentary sectional view on a somewhat larger scale illustrating the assembly of a portion of the components;

FIG. 6 is a view similar to FIG. 2 illustrating use of the solar oven;

FIG. 7 is a view on a somewhat smaller scale taken essentially in the direction of arrows 7—7 of FIG. 3 with some portions of the unit removed; and FIG. 8 is a fragmentary view partially disassembled illustrating how certain components are assembled to each other.

DESCRIPTION OF THE PREFERRED EMBODIMENT

Referring to the drawings, the improved, demountable and portable solar oven according to the invention is shown by the reference character 10. Thus the solar oven comprises a main supporting base 11, a horizontally rotatable base plate 12, a secondary support base collar 13 disposed on the base plate 12, a pair of arms 14 and 15 removably attached to the columnar member 13, a hemispherical oven chamber 16, a hemispherical transparent cover 17 disposed on the hemispherical oven chamber 16 and a series of individual flat reflector members 18 assembled together and attached to the hemispherical oven chamber for reflecting solar energy into the oven chamber as will become clear.

Referring more particularly to FIGS. 2 and 3, the horizontally rotatable base plate 12 is rotatably mounted on the platform 19 of the main supporting base 11 by means of a central pin 21 which may, of course, be a bolt and an appropriate nut as shown. The rotatable base plate 12 may be appropriately separated from the platform 19 by a spacer 22.

The secondary support base collar 13, sometimes referred to herein as the hollow columnar member, is disposed on the horizontal rotatable base plate 12 and may be attached thereto by soldering, for example, (not shown). As shown the secondary support base collar 13 may be a conical shell having a circular opening at its top within which is received the lower half of the solar oven chamber 16 and provides the support for the operating mechanism to rotate the solar oven about its horizontal axis. Thus the support base collar 13 supports one end of a shaft 23 the other end of which is supported by a bracket 24 attached to the base plate 12. The shaft 13 has a worm gear 25 and an angle gear 26 disposed thereon, the angle gear being engaged with a toothed track 27 circularly disposed on a turnable gear wheel 28 rotatably mounted by a central shaft received in a boss 29 supported on the base plate 12. The outer surface of the cooking chamber 20 has a semi-circular gear rack 31 disposed thereon, the gear rack 31 being received by the convolutions of the worm gear 25 when the cooking chamber 20 is disposed in position in the circular opening of the upper portion of secondary support base collar 13. Thus when the gear wheel 28 is rotated, the worm gear 25 is rotated due to the interaction of the gear 26 and the gear track 27 thereby causing the semicircular gear rack 31 to move about the central axis of the cooking chamber and thus causing the cooking member 20 to be rotated about its horizontal axis thereby to dispose its opening toward the sun more directly as will become clear.

The secondary support base collar 13, the horizontal rotatable base plate 12, the worm gear 25 and the rotatable gear wheel 28 along with the associated parts may be a unitary sub-assembly supported on the platform 19 of the base 11.

The cooking chamber 20 may comprise a hemispherical outer shell 32 and inner hemispherical shell 33 and a layer of insulation 34 there between. The inner hemispherical shell 33 is of a highly polished nature so as to reflect solar energy falling thereon into the cooking chamber area as will become clear. The outer hemispherical shell 32 has the semi-circular gear rack 31 attached to it for the purpose already described. As may be visualized in the figures, the cooking chamber 20 is a hemispherical member, the opening of which is, of course, a circle defining the opening edge, or rim. Diametrically disposed adjacent the rim is a pair of pins 35 extending outwardly for support of the oven chamber 20 in the arms 14 and 15 as may now be described. The pins 35 may, for example, be welded to the metal of the outer hemispherical shell 32. The supporting arms 14 and 15 are mirror images of each other and are diametrically disposed on the surface of the secondary support base collar.

Each of the arms 14 and 15 includes a base member 36 having a turned-over lip 37 at one end and a bayonet type slot 38 disposed away from the curled over lip. The bayonet slot 38 has an enlarged circular opening therein which is adapted to be received over the head of a rivet 39 as is well understood. Thus when the arms 14 and 15 are to be disposed in position (See FIG. 3) the enlarged opening of bayonet slot 38 is received over the head of the rivet 39 and the arm 14 is moved downwardly so that the sides of the bayonet slot 38 are engaged under the head of rivet 39 and the lip 37 is received over the upper edge of the base collar 13 as may be visualized in this Figure and FIG. 3c. When disposed as described, the arms 14 and 15 form a relatively rigid supporting structure for the oven chamber. The upper end of the arms 14 and 15 are provided with slots 41 into which the pins 35 are received for pivotally supporting the oven chamber 20. The arms 14 and 15 may be formed of metal but if desired they may be formed of any suitable heat resistant and rigid synthetic materials. The slots 41 form the supporting bearings for pivotal movements of the oven chamber 20 which movements are caused by the rotation of the turnable gear wheel 38 as already described. The rim of the cooking chamber 20 is closed by a shell separator insulator seal 42 which is circular in form and is disposed in the rim around its full circumference. The insulator seal 42 may be held in position by an angular lips 43 and 43a formed in the outer and inner hemispherical shells 32 and 33, respectively.

The cooking chamber 20 pivots readily about the diametrically disposed pivots 35 and its position is determined by the relative positions of the semicircular gear rack 31 and the worm gear 25 as determined by the number of turns the gear wheel 38 has been turned in one direction or the other.

Interiorally of the cooking chamber 25 there is a self leveling hemispherical basket for holding the food to be cooked. The self leveling feature of the food basket 44 is achieved by providing a pair of pivot pins 45 diametrically opposed to each other and from which the food basket 44 is suspended by means of hangers 46. The pins 45 are received in diametrically opposed slots 47 formed in the rim portion of the inner hemispherical shell 33. The diametrically opposed slots 47 are on the same diametrical line as the diametrically opposed pivots 35. Thus, irrespective of the position of the cooking chamber 20 about the axis of pins 35 the food basket will remain horizontal. The hangers 46 may be attached to a rim 75 forming part of basket 44. Maintaining of the basket horizontal is facilitated by the provision of a weight element 48 disposed at the bottom thereof. As may be noted in FIG. 2 the cooking chamber is disposed at a substantial angle, for example, about 70°, and the food basket 44 is shown as horizontal. For maintaining the food container horizontal irrespective of the orientation of the cooking chamber, a gimbel ring effect is achieved by providing a further food container 76, FIG. 2a, with pivot pins 77 which are received in grooves 78 in the rim 75. The axis of pins 77 and the grooves 78 is at right angles to the axis of the pins 45. Thus the food container will remain horizontal irrespective of the tilt of the cooking chamber 25. The cooker may thus be carried on a boat subject to pitch and roll. Food, liquids for example, would not be spilled.

For retaining heat within the cooking chamber a transparent hemispherical cover 49 is provided. The cover is of a diameter to be relatively easily but frictionally engagably received within a circular slot 51, or groove, formed in the insulator seal member 42. Because of its transparency the hemispherical cover permits all of the sun's radiation that falls upon it to penetrate it and be projected upon the food disposed in the chamber. Similarly for any solar radiation that falls upon the reflectors 18 and is reflected toward the center of the food chamber. Axially of the cone defined by the system of reflecting members 18, which is to say centrally vertically of the hemispherical cooking chamber 20 and the hemispherical cover 49 when the cooking chamber is disposed with its rim horizontal, there is a cover knob 52 trapezoidal in shape and cross section so as to form a convenient handle for removing the hemispherical cover 49. Centrally of the cover knob 52 there is a shadow pin 53 disposed perpendicularly to the surface of the hemispherical cover 49. Thus when the oven is pointed directly at the sun the shadow pin 53 will cast no shadow and by using this criterion the position of the oven may be adjusted to any desired position including that of where the sun's rays are parallel to the axis of the shadow pin 53. Whenever the pin 53 casts a shadow the operator knows that the oven is not pointed directly at the sun, and the length of the shadow indicates how far removed the axis of the oven is from the direction of the sun. In this manner the oven may be disposed in any position desired.

In order to vent any fumes, moisture or other gases forming during the cooking process the cooking chamber 20 is provided with a vent 54.

As indicated the food basket 44 may consist of a framework within which the food to be cooked is disposed. The basket may of course be just that, namely, a basket having no further structure therein, and a food containing receptacle such for example a pan may be disposed inside of the basket, or, food may be disposed in the basket itself. However, as shown in FIG. 6, the food basket 44 may contain a removable shelf plate 55 that may rest on the edge, or periphery, of the food basket. In this case there may be a food container 56 disposed on the bottom of the food basket and a further food container 57 disposed on the shelf plate 55. In this manner two different items in two different containers may be heated at the same time.

To collect for cooking purposes a greater amount of sun's energy that would fall upon the hemisphere 20 itself the reflectors 18 are provided as shown in the various figures. The reflectors 18 may conveniently be flat plates that are highly polished on the exposed sun side and are hinged together by pins 58 and piano hinges 59. The outer or free edges of the hinged pair of reflectors 18 are hinged together by a removable hinge pin 61 and piano hinges 62. The hinge pins 58 and 61 are longer than the piano hinges 59 and 62 respectively. The increased length of the hinge pins 58 and 61 is utilized to attach the reflector combination to the solar oven. For this purpose a series of holes are formed the hemispherical outer shell 32 and are lines with reflector pin sleeves 63 as may be seen in FIG. 5. Thus the reflector plates are attached to the oven by first disposing the ends of the hinge pins 58 into the appropriate (every other one) holes and sleeves 63. Thereafter adjacent reflector panels 18 are brought together to form hinges 62 and the hinge pins 61 are pushed there-through. The extended ends of the pins 61 are pushed into the receptacles of sleeves 63. When all of the reflector parts are attached to the solar oven by disposing all of the elongated hinge pins 61 into place, the reflector is firmly attached to the solar oven by pins 58 and 61 and cannot be removed except by individually removing the hinge pins 61. This is due to the fact that the hinge pins 58 and 61 are disposed at an angle and when disposed in their respective sleeves 63 they cannot be pulled out as a unit but only individually as to 61. As has been depicted in FIG. 6, the rays of the sun are shown by the lines 64 impinging upon the reflectors 18 and being reflected into the center portion of the spherical cooking chamber and of course impinging upon the food disposed there. Rays that do not hit the food directly contact the reflecting surface of the inner hemispherical shell and thus are reflected on that surface to the food chambers. Hence all of the sun's energy is reflected into the cooking area and made use of.

Referring to FIG. 2 it will be observed that the main supporting base 11 includes an angularly extending side 65 depending from the platform 19. Interiorly of the angularly extending side are a series, for example four, sleeves 66 within which may be disposed the shafts 67, or legs, at the base of which there are spherical feet 68. Other shapes for the feet, or pads, 68 and/or the shafts or legs 67 may, of course, be used. The sleeves 66 may be attached to the inner surface of the angular side in any manner such as by soldering or welding, for example. The legs 67 are held in their relative positions of adjustment by thumb screws 69, for example.

The horizontally rotatable base plate 12 is provided with a series of pointers 71 as may be seen by observing FIG. 4. Conveniently there may be twenty-four of such pointers 71, in effect determinations of a scalloped circumference or periphery, one for each of the hours of a twenty-four hour day. Thus by observing the position of a pointer 71 relative to the starting point 72, the oven can be rotated with its axis as determined by the center of the spherical chamber and the shadow pin 53 in any direction relative to the sun that may be desired insofar as horizontal rotation is concerned. In relatively the same manner by noting the number of revolutions that the gear wheel 28 is rotated the vertical position, or angle, of the axis of the cooker may be disposed as desired. By combining these two features, of course, the desired position of the cooker is determined for any condition.

A spirit level 73 may be provided in connection with the starting point 72 so that the oven may be leveled by an appropriate adjustment of the feet 68. Extensions 74 as may be seen in FIG. 3 may be provided for lengthening the legs 67 in order to raise the oven higher off the ground if that is desired.

The oven is totally disassembable for storage in a relatively small space. Thus, for example, the base member 11 is one unitary structure, and by removal of the nut and pin 21 the secondary supporting structure including the collar 13 and the supporting gear works in a second unitary structure and is a removable unit. The cover 49 is removable as is the food basket 44 although these two units may be nested one within the other and also within the interior of the oven 20. By removal of the pins 68 the reflectors in pairs are removable and the reflecting pairs may be folded relative to each other into a flat combination having the dimensions of only one reflector. The reflectors may then, of course, be stored flat in any convenient location. Thus, a total of two packages, one containing the spherical or hemispherical parts and the other containing the base and the other components including the vertically supporting arms 14 and 15 is achieved. These make for very conveniently small packages.

The angle of the reflectors 18 may be selected as desired but it has been found that an angle of 60° relative to the plane of the oven's rim achieves very satisfactory results.

I claim:

1. A demountable solar oven comprising a supporting base, a horizontally rotatable member mounted on said base, a hollow columnar member having a circular opening disposed on said rotatable member, a pair of arms removably attached at one end to said columnar member and having their other ends projecting upwardly, a hemispherical oven chamber including a diametrically opposed first pair of pivot members on its open rim removably disposed, respectively, on said other ends, a gear mechanism supported by said columnar member, a gear member disposed on the surface of said hemispherical oven chamber and engaged with said gear mechanism, means for rotating said gear mechanism and pivoting said oven chamber about said diametrically opposed first pivots for changing the oven's solar angle, a self leveling food container including a rim removably disposed in said oven chamber, said self leveling food container comprises a second pair of pivot members on said rim inward of said hemispherical oven chamber on the same axis as said diametrically opposed pivots, and a third pair of pivot members on said food container on an axis at right angles to said second pair of pivot members.

2. The solar oven according to claim 1 wherein said oven chamber comprises inner and outer metallic hemispherical members separated by a layer of thermal insulation, said first pair of pivot members comprises pins attached to said outer metallic hemispherical member, said second pair of pivot members comprise pins attached to said rim, and said third pair of pivot members comprises pins on said food container and grooves on said rim.

3. The solar oven according to claim 2 wherein said second pair of pivot members comprises receptacles on said inner metallic hemispherical member and said third pair of pivot members comprises outwardly directed pins on the rim of said food container.

4. The solar oven according to claim 3 wherein said self leveling food container comprises a container having a weighted bottom.

5. A demountable solar oven comprising a supporting base, a horizontally rotatable member mounted on said base, a hollow columnar member having a circular opening disposed on said rotatable member, a pair of arms removably attached at one end to said columnar member and having their other ends projecting upwardly, a hemispherical oven chamber including a diametrically opposed first pair of pivot members on its open rim removably disposed, respectively, on said other ends, a gear mechanism supported by said columnar member, a gear member disposed on the surface of said hemispherical oven chamber and engaged with said gear mechanism, means for rotating said gear mechanism and pivoting said oven chamber about said diametrically opposed first pivots for changing the oven's solar angle, and a self leveling food container including a rim removably disposed in said oven chamber, said self leveling comprises a second pair of pivot members on said rim inward of said hemispherical oven chamber on the same axis as said diametrically opposed pivots.

6. The solar oven according to claim 5 wherein said oven chamber comprises inner and outer metallic hemispherical members separated by a layer of thermal insulation, said first pair of pivot members comprises pins attached to said outer metallic hemispherical member, and said second pair of pivot members comprise pins attached to said rim.

7. The solar oven according to claim 6 wherein said second pair of pivot members comprises receptacles on said inner metallic hemispherical member and said self leveling food container comprises a container having a weighted bottom.

8. The solar oven according to claim 5 including a hemispherical transparent cover receivable at its circular edge on the edge of said solar oven chamber, and a shadow pin perpendicular to and centrally of said transparent cover.

9. The solar oven according to claim 8 including a handling knob surrounding said shadow pin.

10. The solar oven according to claim 8 including a series of elongated reflecting segments adjacent each other and attached to the rim of said solar oven chamber.

11. The solar oven according to claim 10 wherein adjacent ones of pairs of segments are hinged to each other and further hinge pins attach the segmented pairs to each other and to the rim of said solar oven chamber.

12. The solar oven according to claim 11 wherein said rotatable member includes a central pivot attachment to said base and said base includes telescoping legs for positioning.

13. The solar oven according to claim 12 including indicia for determining the amount of horizontal rotation and means are provided for determining the amount of vertical rotation.

14. The solar oven according to claim 13 wherein said base includes means for indicating the level thereof.

* * * * *